United States Patent [19]

Micali et al.

[11] Patent Number: 4,944,009

[45] Date of Patent: Jul. 24, 1990

[54] PSEUDO-RANDOM SEQUENCE GENERATOR

[75] Inventors: Silvio Micali, Cambridge, Mass.; Claus Schnorr, Bad Nauheim, Fed. Rep. of Germany

[73] Assignee: Massachusetts Institute of Technology, Cambridge, Mass.

[21] Appl. No.: 160,354

[22] Filed: Feb. 25, 1988

[51] Int. Cl.$^5$ .............................................. H04L 9/02
[52] U.S. Cl. ..................................... 380/46; 364/717; 380/30
[58] Field of Search ........... 364/717, 200, 900, 224.21; 331/78; 380/46, 50, 49, 28–30

[56] References Cited

U.S. PATENT DOCUMENTS

| 4,208,739 | 6/1980 | Lu et al. ................................ 380/28 |
| 4,405,829 | 9/1983 | Rivest et al. ......................... 380/30 |
| 4,799,259 | 1/1989 | Ogrodski ............................... 380/46 |

FOREIGN PATENT DOCUMENTS

| 1174364 | 9/1984 | Canada ................................ 364/717 |
| 3339985 | 5/1985 | Fed. Rep. of Germany ...... 364/717 |
| 0785859 | 12/1980 | U.S.S.R. ............................... 364/717 |

OTHER PUBLICATIONS

Miller et al., "A Simple Technique for the Determination of Delayed Maximal Length Linear Binary Sequences"; IEEE Trans. on Computers, (vol. C-26, No. 8; 8/77; pp. 808-811).
Guild, "Fully Iterative Fast Array for Binary Multiplication and Addition"; Electronics Letters, (vol. 5, No. 12; 6/59; p. 263).
Oded Goldreich et al., "How to Construct Random Functions," *Journal of the Association for Computing Machinery*, vol. 33, No. 4, Oct. 1986, pp. 792–807.
Blum, L., Blum, M. and Shub, M., "A Simple Unpredictable Pseudo-Random Number Generator," *Siam J. Comp.*, (1986), pp. 364–383.
Stern, J., "Secret Linear Congruential Generators are Not Cryptographically Secure," Proc. 28th IEEE Symp. on Comp. Sci. (1987), pp. 421–426.
Shamir, A., "On the Generation of Cryptographically Strong Pseudorandom Sequences," *ACM Trans. Comput. Syst.* 1, 1 (Feb. 1983) pp. 38–44.
Alexi, W., Chor. B., Goldreich, O. and Schnorr, C. P., "RSA and Rabin Functions: Certain Parts are as Hard as the Whole," *Siam J. Comp.*, 17, No. 2, Apr. (1988) pp. 194–209.

*Primary Examiner*—Stephen C. Buczinski
*Assistant Examiner*—Bernarr Earl Gregory
*Attorney, Agent, or Firm*—Hamilton, Brook Smith & Reynolds

[57] ABSTRACT

A seed random sequence is extended in successive nodes of a tree structure of a random sequence generator. At each node, an input sequence is expanded to an output sequence substantially greater than the length of the input sequence. Plural processors operate in parallel in generating the final output sequence, and subsequences may be directly accessed as a starting location of the output sequence. The random sequence generator is accessed by an index in an encryption system. In a sequential generator, less than all of the bits from the generator unit are reapplied to the generator unit in an iterative process.

60 Claims, 3 Drawing Sheets

PSEUDO-RANDOM SEQUENCE GENERATOR

BACKGROUND OF THE INVENTION

A random number generator (RNG) is an efficient device that transforms short random seeds into long pseudo-random strings. A classical RNG is the linear congruential generator (LCG) that is based on the recursion $x_{i+1}=ax_i+b(\bmod N)$. It is well known that the LCG passes certain statistical tests, e.g., for a clever choice of the parameters a,b,N it generates well mixed numbers (see Knuth 1980). There are more elaborate statistical tests which the LCG fails. Stern (1987) shows that the sequence generated by the LCG can be inferred even if the parameters a,b,N and the seed $x_0$ are all unknown.

The concept of a perfect random number generator (PRNG) has been introduced by Blum, Micali (1982) and Yao (1982). A RNG is perfect if it passes all polynomial time statistical tests, i.e., the distribution of output sequences cannot be distinguished from the uniform distribution of sequences of the same length. So far, the proofs of perfectness for the known PRNG's are all based on unproven complexity assumptions. This is because superpolynomial complexity lower bounds cannot be proven.

Perfect random number generators have been established, for example, based on the discrete logarithm by Blum, Micali (1982), based on quadratic residuosity by Blum, Blum, Shub (1982), based on one way functions by Yao (1982), and based on Rivest/Shamir/Adleman (RSA) encryption and factoring by Alexi, Chor, Goldreich and Schnorr (1984). All these PRNG's are less efficient than the LCG. The RSA/RABIN-generators are the most efficient of these generators. They successively generate log N pseudo-random bits by one modular multiplication with a modulus that is N bit long.

Disclosure of the Invention

In accordance with the present invention, a random sequence generator generates a random sequence from a seed random sequence which is of substantially shorter length. Most likely, the seed would be truly random and the generated sequence would be pseudo-random, but the term "random" is used to include both random and pseudo-random sequences. The generator performs a tree operation by extending, at each node of a tree structure, a node input random sequence. A plurality of node output sequences of the tree structure together comprise a final random output sequence. The final random output sequence is preferably generated as successive leaves of the tree structure. The tree structure allows for direct access to any leaf as a starting leaf of a sequence. The parallel structure of the tree allows for generation of the sequence with parallel processors which, but for initial seeds, may operate independently of each other.

In a preferred embodiment, each node input sequence is extended by the RSA operation $$y=a_e x^e + a_{e-1} x^{e-1} + \ldots + a_1 x + a_0 (\bmod N)$$

where e, $a_e$, $a_{e-1}$, ..., $a_0$ and N are integers, the node input sequence represents x and the node output sequence represents y. In a preferred system, the RSA function is reduced by setting all a's equal to zero except one, $a_d$, which is set to equal one. The greatest common divisor of d and Euler's Totient function $\phi(N)$ is equal to one. Specifically, N is the product of two large random primes p and q, and d is an integer that is relatively prime to $(p-1)(q-1)$, preferably 3.

In either a sequential or a tree operation, the final sequence is generated in iterative steps. At each step, a new string of bits is obtained by applying a function to significantly less than all of the bits of a previous string. At least part of the bits of a previous string to which the function is not applied are utilized toward the output, either directly or with application of the function in a tree structure.

One application of the random sequence generator is in an encryption system. An encryption unit performs a transform between an encrypted message and a nonencrypted message using the random sequence generated by the random sequence generator. An index may be applied to the generator to indicate the leaf of the tree at which the sequence applied to the encryption unit begins.

DESCRIPTION OF PREFERRED EMBODIMENTS

An electronic random number generator, or random sequence generator, takes an input sequence of some number of bits which represents an input x and extends that sequence to a sequence of bits which represents a number y, the number of bits representing y being greater than the number of bits representing x. There are many functions which can easily extend the number m of bits by a factor of about 2. Difficulties in designing random generators exist, however, when substantially longer output sequences are required from a given length seed sequence. At some length, degradation of the output, such that it can no longer be considered random, is encountered.

In accordance with the present invention, a random sequence need only be expanded by a factor of about 2 in the generator 12. With such a short output sequence, the output can be considered near perfectly random. In accordance with the present invention, that perfectly random output is further extended in successive operations of the same generator 12 in a data processor tree structure illustrated in FIG. 2. The initial input sequence is first expanded by a factor of about 2 in a generator 12A. Portions of the output sequence from generator 12A are applied to respective inputs of generators 12B and 12C. Each of those generators then further expands the random sequence. For example, portions of the output from generator 12B are applied to the inputs of respective generators 12D and 12E.

Figure 1:
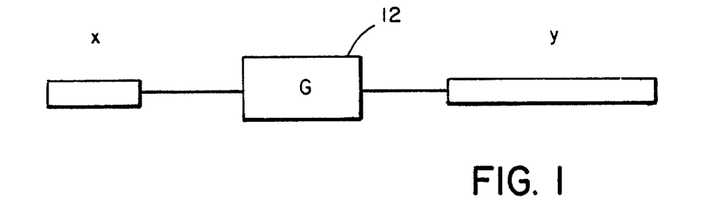
FIG. 1 is a schematic illustration of a random sequence generator having an output sequence y greater in bit length than an input sequence x.
Figure 2:
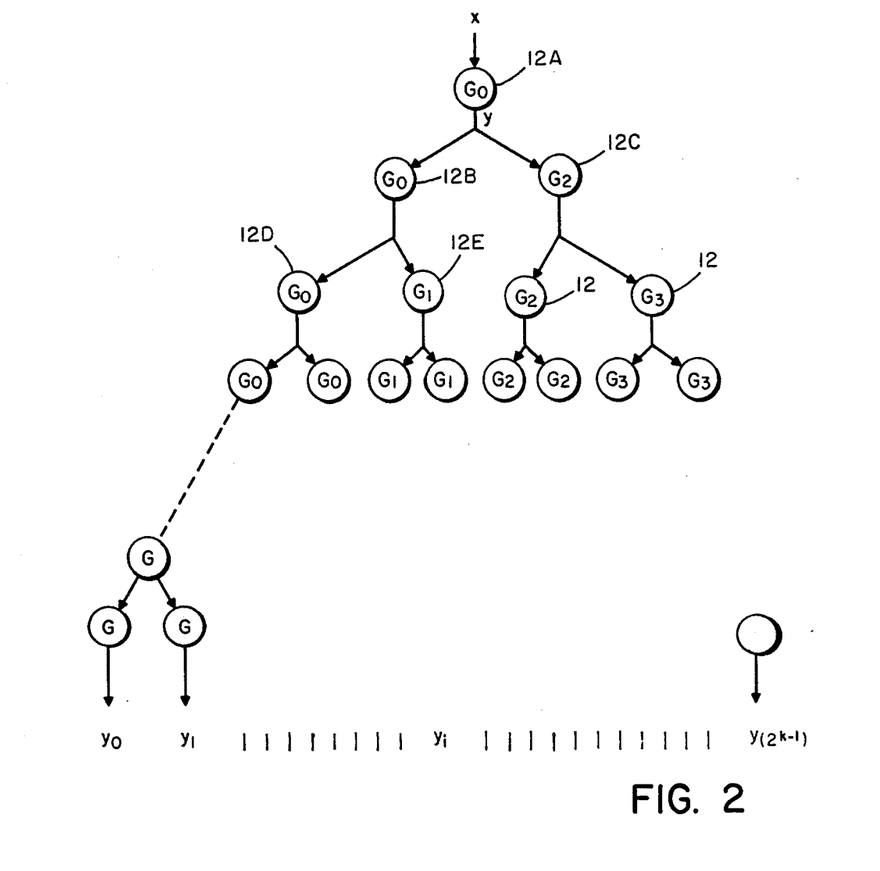
FIG. 2 is an illustration of a random sequence generator having a tree structure in accordance with the present invention, each node comprising a generator as illustrated in FIG. 1.

It will be recognized that the output sequence of the generator need not have exactly twice the number of bits of the input sequence. Some bits from a larger output sequence may be ignored, or there may be overlap in the bits applied to the respective generators if the number of bits in the output y is less than twice the number of bits in the input x. Also, no particular portion of the output sequence need be passed on to each successive generator. Further, although a binary tree is most convenient, tertiary and wider trees may be used.

It is recognized that for a short output sequence $y_0$, $y_1$, $y_2$..., the binary tree adds unnecessary operations in the overall generation. With a tree of K levels of generators, K operations would be required to generate the bit sequence $y_0$. However, any sequence $y_i$ of the $y_{(2^K-1)}$ sequences can be accessed with the same number of operations, and for a very long sequence the tree becomes efficient because each simple generator operation in the tree supports generation of plural sequences $y_i$ provided at the leaves of the tree. Thus, to provide a final sequence formed of $2^{K-1}$ leaves, each of a predetermined bit length, the tree need only perform $(2^K-1)$ operations through K generator levels. This process can be made very rapid by the use of parallel processors, as illustrated by FIGS. 2 and 3.

Figure 3:
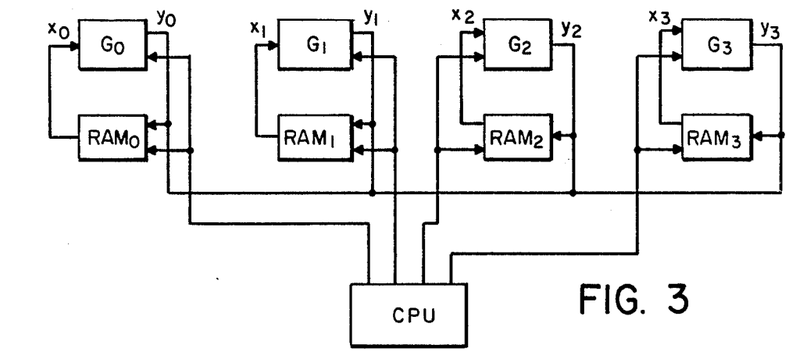
FIG. 3 illustrates a multiprocessor system for performing the tree structure of FIG. 2.

FIG. 3 illustrates four random generators $G_0$, $G_1$, $G_2$ and $G_3$ which may operate independently of each other. Each generator receives a sequential node input sequence from a respective random access memory, $RAM_0$, $RAM_1$, $RAM_2$, $RAM_3$, and outputs a longer sequence which is itself stored in the respective RAM for application to the generator at successive nodes of the tree. At the first node of the tree, only generator $G_0$ performs an operation. A portion of its output is retained in $RAM_0$, and a portion is transferred by the CPU to $RAM_2$. In the next level of the tree, generators $G_0$ and $G_2$ perform their respective operations to provide extended node output sequences. A portion of the output from $G_0$ is again stored in $RAM_0$, and another portion is stored in $RAM_1$. Similarly, a portion of the output from generator $G_2$ is stored in $RAM_2$, and a portion is stored in $RAM_3$. Output sequences from the nodes need only be stored until input to both nodes of a lower level. From FIG. 2, it can be seen that, in all levels of the tree below the third, the processors and associated RAMs may operate independently. It can be seen that four processors reduce the processing time for a full length sequence almost to one-fourth the processing time of a single generator. Additional processors will of course further reduce the processing time of a large binary tree.

In some applications, such as in cryptography, it may be desirable to have a very long random sequence available but to be able to select a different starting point within the sequence for each encoding operation. The binary tree structure of FIG. 2 allows any subsequence $y_i$ to be accessed in K operations by simply defining the path through the binary tree to that leaf. Successive leaves may then be generated with relatively few additional operations because of the shared nodes through the tree. In other applications, a more rapid output of the initial subsequences may be desired. In that case, the initial subsequences may be output from nodes other than the leaves at the lower level of FIG. 2.

Figure 5:
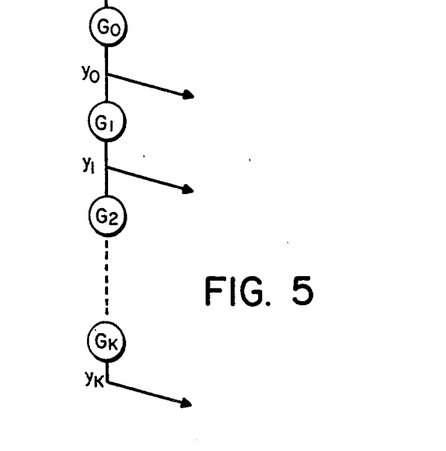
FIG. 5 illustrates a sequential polynominal generator.

FIG. 5 illustrates an encryption system utilizing the random sequence generator of FIG. 2. In the system, a message M is encrypted in a sending unit 14, transferred over publicly accessible communications link 16 as an encrypted message C and decrypted to readable form at a receiving unit 18. Each of the sending and receiving units comprises an encryption unit, the encrypter 20 of the sending unit 14 and the decrypter 22 of the receiving unit. The two units also have identical random sequence generators 24 and 26 which are of the form illustrated in FIG. 2.

Conventional encryption systems utilize a random sequence, which is shared by both the sending and receiving units but is unknown to the public, to first encrypt the message and then decrypt the message. The random sequences must be transferred from one unit to another in a secure fashion for later use. To maintain the security of the system, longer sequences are best used with each encryption, and different sequences are best used in successive encryptions. This ordinarily requires that either a very long random sequence be transferred, or that only a seed x be transferred and that a random sequence generator be used to extend the seed x.

Figure 4:
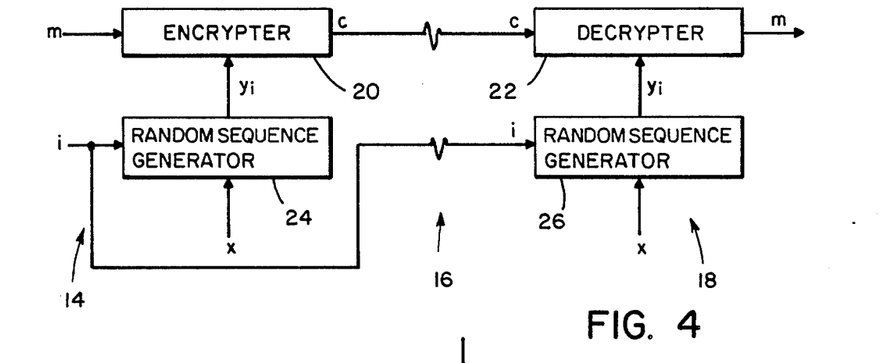
FIG. 4 illustrates an encryption system utilizing the generator of FIG. 2.

A drawback of conventional random sequence generators is that they are sequential in nature, and thus the sequence must be generated from the beginning to access a subsequence within the overall sequence. An advantage of the sequence generator of FIG. 2 is that the leaves $y_i$ are individually accessible by merely specifying the path to that sequence through the tree as by an index i. Thus, in the system of FIG. 4, an index i is applied to the sequence generator 24 at the sending unit to access a sequence which begins at $y_i$. That index is also communicated to the receiving unit so that the same sequence beginning at $y_i$ can be generated for decryption. Thus, by securely transferring a short seed x and providing each of the units with an identical sequence generator, any extended portion of the entire sequence $y_0, y_1, \ldots, y_{(2^K)}$ can be accessed by an index i, and the first subsequence of the accessed sequence is obtained in K operations.

A preferred generator for use at each node of the tree of FIG. 2 is a simplified RSA generator in which the input sequence is extended by the modular operation $y = ax^d \pmod{N}$, where N is the product of two large random primes p and q, and d is an integer that is relatively prime to $(p-1)(q-1)$. Preferably, a equal 1, $d=3$, and the bit length of x is short relative to the bit length of N. For example, the bit length of x may be $\frac{2}{3}$ that of N.

The full RSA function, presented by Rivest et al. in U.S. Pat. No. 4,405,829, is as follows:

$$y = a_e x^e + a_{e-1} x^{e-1} + \ldots + a_1 x + a_0 \pmod{N}$$

where e, $a_e$, $a_{e-1}$, ..., $a_0$ and N are integers. For security, there should be at least one $a_d$ of $a_e$, $a_{e-1}$, ..., $a_3$ which is not equal to zero, and the greatest common divisor of d and Euler's Totient function $\phi(N)$ is equal to one. One such d is 3.

The advantage of the function $y = x^3 \pmod{N}$ where x is short relative to N is that the output sequence is near twice the length of the input sequence with only two multiplications by x and a division by N to determine the remainder. The same number of operations would be required for $d=4$, but the output would not be so perfectly random unless some bits of (information about) $y = x^d \pmod{N}$ are discarded. Even so, the output would be longer than the input sequence.

In prior uses of the RSA function in random generators, an extended output from a seed is generated by iterative operations of the function while outputing a limited number of bits from each operation. Therefore, with each operation of the RSA function, a number of bits less than the number of input bits would be output in the output sequence. A longer output sequence is obtained only by continued iterations of the RSA operation. Subsequences $y_i$ are not accessible directly, and multiple processors cannot perform independently in parallel to more rapidly generate the sequence. In the present system, the full output of a single RSA operation, or at least a number of bits greater than the number of bits in the input, is applied to the next level of the binary tree. Subsequences are directly accessible, and parallel processing can be used to great advantage.

As noted above, from each operation of the generator G, a number of bits greater than the number of bits in the input to the generator are utilized toward the final output. Because of the security of the particular RSA function utilized in the generator, even sequential generators having this feature may be designed as illustrated in FIG. 5. In this figure, each of the generators G may perform the RSA function $y=x^d \pmod{N}$. The bit length of each output y of each generator is significantly longer than the bit length of each input. Thus, less than all of the bits output from each generator are applied to the next generator. A significant number of bits, particularly those not applied to the next generator, are available for output.

This sequential generator allows for the very rapid generation of a relatively long sequence. It is much more rapid than the usual generators based on the RSA function because such generators reapply the full output sequence from each generator to the next generator in the iterative process, and only a few bits are output from each step of the process. Because of the high security of the particular RSA function chosen in the present application, fewer bits need be applied to each generator, for more rapid processing at individual generators, and a larger number of bits may be output from each individual generator, for more rapid output of the full random sequence. The sequential generator of FIG. 5 does suffer the disadvantage of the typical RSA generator in that individual subsequences of the output are not directly accessible.

A more theoretical discussion of the function used in the generator G and of the parallel tree structure and sequential generator follows.

We extend and accelerate the RSA-generator in various ways. We give evidence for more powerful complexity assumptions that yields more efficient generators. Let $N=pq$ be product of two large random primes p and q and let d be a natural number that is relatively prime to $\phi(N)=(p-1)(q-1)$. We conjecture that the following distributions are indistinguishable by efficient statistical tests (see Hypothesis 2.1):

the distribution of $x^d \pmod{N}$ for random $x \in [1,N^{2/d}]$.
the uniform distribution on $[1,N]$.

This hypothesis is closely related to the security of the RSA-scheme. Under this hypothesis the transformation $$[1,N^{2/d}] \ni x \to x^d \pmod{N} \in [1,N]$$

stretches short random seeds $x \in [1,N^{2/d}]$ into a pseudo-random numbers $x^d \pmod{N}$ in the interval $[1,N]$. We build various random number generators on this transformation. The sequential polynomial generator (SPG) generates from random seed $x \in [1,N^{2/d}]$ a sequence of numbers $x = x_1, x_2, \ldots, x_l, \ldots \in [1,N^{2/d}]$. The $n(1-2/d)$ least significant bits of the binary representation of $x_i^d(\mod N)$ are the output of $x_i$ and the $2n/d$ most significant bits form the successor $x_{i+1}$ of $x_i$, where n is the number of bits in N.

It follows from a general argument of Goldreich, Goldwasser, Micali (1986) and the above hypothesis that all these generators are perfect, i.e. the distribution of output strings is indistinguishable, by efficient statistical tests, from the uniform distribution of binary strings of the same length. The sequential generator is nearly as efficient as the LCG. Using a modulus N, that is n bit long, it outputs $n(1-2/d)$ pseudo-random bits per iteration step. The costs of an iteration step $x \to x^d \pmod{N}$ with $x \in [1,N^{2/d}]$ corresponds to the costs of a about one full multiplications modulo N. This is because the evaluation of $x^d \pmod N$ over numbers $x \le N^{2/d}$ consists almost entirely of multiplications with small numbers that do not require modular reduction.

We extend the SPG to a parallel polynomial generator (PPG). The PPG generates from random seed $x \in [1,N^{2/d}]$ a tree. The nodes of this iteration tree are pseudo-random numbers in $[1,N^{2/d}]$ with outdegree at most $d/2$. To compute the successor nodes $y(1), \ldots, y(s)$ and the output string of node y we stretch y into a pseudo-random number $y^d \pmod N$ that is n bit long. Then the successors $y(1), \ldots, y(s)$ of y are obtained by partitioning the most significant bits of $y^d \pmod N$ into $s \le d/2$ bit strings of length $\lfloor 2n/d \rfloor$. The output of node y consists of the remaining least significant bits of $y^d \pmod N$. Any collection of subtrees of the iteration tree can be independently processed in parallel once the corresponding roots are given. In this way m parallel processors can speed the generation of pseudo-random bits by a factor m. These parallel processors need not to communicate; they are given pseudo-independent input strings and their output strings are simply concatenated. The concatenated output of all nodes of the iteration tree is pseudo-random, i.e. the parallel generator is perfect. The PPG enables fast retrieval of substrings of the pseudo-random output. To access a node of the iteration tree we follow the path from the root to this node. After retrieving a bit the subsequent bits in the output can be generated at full speed. Iteration trees of depth at most 30 are sufficient for practical purposes; they generate pseudo-random strings of length $10^{20}$ (for outdegree 4) such that individual bits can be retrieved within a few seconds.

The Complexity Assumption for the Polynomial Random Generator

Let $P(x)$ be a polynomial of degree $d \ge 2$ with integer coefficients and let N be an integer that is n bits long, i.e. $2^{n-1} \le N < 2^n$. We denote $l = \lfloor 2n/d \rfloor$. Residue classes modulo N are identified with the corresponding integers in the interval $[1,N]$.

The polynomial generator is based on the transformation $$[1,M] \ni x \to P(x) \bmod N \qquad (1)$$

where x ranges over a sufficiently large subinterval $[1,M]$ of $[1,N]$. We would like that the outputs of (1), for random $x \in [1,M]$ and given N, M and P, be indistinguishable from random $y \in [1,N]$. The following conditions and restrictions are clearly necessary.

the modulus N must be difficult to factor since given the factorization of N we can easily invert (1).

M must be sufficiently large to make $P(x)/N$ large for almost all $x \in [1,M]$. This is because we can easily invert (1) provided that $P(x)/N$ is small.

$P(x)$ must not be a square polynomial. If $P(x)=Q(x)^2$ for some polynomial Q then the Jacobi-symbol $$\left(\frac{P(x)}{N}\right)$$

is 1 for all x whereas prob $$\left[\left(\frac{y}{N}\right)=1\right] = \text{prob}\left[\left(\frac{y}{N}\right)=-1\right]$$

for random $y \in [1,N]$. Since the Jacobi-symbol can be evaluated efficiently we can distinguish $P(x)$ mod N from random numbers $y \in [1,N]$.

$P(x)$ must not be a linear transform of a square polynomial. If $P(x)=aQ(x)^2+b$ we can, from $P(x)$ mod N, recover $Q(x)^2$ mod N and check that $$\left(\frac{Q(x)^2}{N}\right)=1.$$

We choose $N,M,P(x)$ as to correspond to these conditions. Let N be a random number that is uniformly distributed over the set $$S_n = \left\{ N\epsilon \;\middle|\; \begin{array}{l} N = p \cdot q \text{ for distinct primes } p,q \\ \text{such that } 2^{n/2-1} < p,q < 2^{n/2} \end{array} \right\}$$

of integers that are products of two distinct primes which each is n/2 bits long. We choose arbitrary M that are proportional to $2^l$, $M=\theta(2^l)$; i.e. $1/c \leq 2^l/M \leq c$ for some absolute constant $c>0$. Then M is proportional to $N^{2/d}$ for all $N \epsilon S_n$. The choice for the polynomials $P(x)$ seems to be subject to only a few restrictions. We are going to study a particular class of permutation polynomials where the hypothesis below can be justified by known theory. These are the RSA-polynomials $P(x)=x^d$ with d relatively prime to $\phi(N)=(p-1)(q-1)$.

Rivest, Shamir and Adleman (1978) have invented the RSA-cryptoscheme that is based on the multiplicative group $$Z^*_N = \{x (\bmod N) | \gcd(x,N)=1\}$$

of residue classes modulo N that are relatively prime to N. The integer N is product of two odd primes, $N=p \cdot q$. The order of the group $Z^*_N$ is $\phi(N)=(p-1)(q-1)$. The transformation $$x \to x^d (\bmod N) \tag{2}$$

with $\gcd(\phi(N),d)=1$ is a permutation on the residue classes modulo N, i.e. it permutes the integers in the interval $[1,N]$. The inverse transformation is given by $x \to x^e \pmod{N}$ where $e=d^{-1} \bmod \phi(N)$. The permutation (2) with $\gcd(\phi(N),d)=1$ and $d \neq 1$ is an RSA-enciphering function. The enciphering key d does not reveal the inverse key e provided that $\phi(N)$ is unknown. Knowledge of $\phi(N)$ is equivalent to knowing the factorization $N=p \cdot q$. The security of the RSA-scheme relies on the assumption that RSA-enciphering $x \to x^d (\bmod N)$ is difficult to invert when d, N are given but $\phi(N)$ and $e=d^{-1} \bmod \phi(N)$ are unknown. All known methods for inverting RSA-enciphering require the factorization of N.

We are going to show that the following hypothesis is closely related to the security of the RSA-scheme. Our random number generators will rely on this hypothesis.

Hypothesis 2.1 Let $d \geq 3$ be an odd integer and $l = \lfloor 2n/d \rfloor$. For random $N \epsilon S_n$ such that $\gcd(d,\phi(N))=1$ and for all $M=\theta(2^l)$ the following distributions on $[1,N]$ are indistinguishable by polynomial time statistical tests:

the uniform distribution on $[1,N]$,
$x^d (\bmod N)$ for random $x \in [1,M]$.

We explain the hypothesis in more detail. The concept of a statistical test has been introduced by Yao (1982). A polynomial time statistical test is a sequence $T=(T_n)_{n \in \mathbb{N}}$ of probabilistic algorithms with a uniform polynomial time bound $n^{o(1)}$. According to Yao it is sufficient to consider statistical tests with 0,1-output. Let $$p_n^T = \text{prob}[T_n(y,N)=1]$$

be the probability that $T_n$ outputs 1. The probability space is that of all integers $N \epsilon S_n$ with $\gcd(d,\phi(N))=1$, all numbers $y \in [1,N]$ and all 0–1 sequences of internal coin tosses, with uniform distribution. Let $$p_n^{-T}(M)$$

be the same probability with random numbers $y \in [1,N]$ replaced by $y=x^d (\bmod N)$ for random $x \in [1,M]$. The hypothesis means that for every polynomial time statistical test T and all $M_n = \theta(2^l)$ $$\lim_n |p_n^T - p_n^{-T}(M_n)| = 0 \text{ for all } t > 0. \tag{3}$$

We say that the statistical test T $\epsilon_n$-rejects RSA-ciphertexts $x^d (\bmod N)$ of random $x \in$ $$[1,M_n] \text{ if } |p_n^t - p_n^{-T}(M_n)| \geq \epsilon_n$$

for infinitely many n. If (3) holds for all polynomial time statistical tests T we call RSA-ciphertexts $x^d (\bmod N)$ of random messages $x \in [1,M_n]$ pseudo-random in $[1,N]$. In this case the distributions of $x^d (\bmod N)$ for random $x \in [1,M_n]$ and the uniform distribution on $[1,N]$ are called indistinguishable.

In general two sequences of distributions $(D_n)_{n \in \mathbb{N}}$ and $(\overline{D}_n)_{n \in \mathbb{N}}$ are called indistinguishable if for every pol. time statistical test $(T_n)_{n \in \mathbb{N}}$, that is given random inputs with respect to $D_n(\overline{D}_n, \text{resp.})$ the probability $$p_n^T(p_n^T,$$

resp.) of output 1 satisfy lim $$|p_n^T - p_n^T| n^{-t} = 0$$

for all $t \geq 0$. In case of indistinguishable distributions $D_n, \overline{D}_n$ and if $D_n$ is the uniform distribution on set $C_n$ then random elements with respect to $\overline{D}_n$ are called pseudo-random in $C_n$. In case of pseudo-random pairs (x,y) we call x and y pseudo-independent. A random number generator is called perfect if it transforms random seeds into pseudo-random strings.

It can easily be seen that the Hypothesis 2.1 can only fail if RSA-enciphering leaks partial information on RSA-messages.

Fact 2.2 Suppose Hypothesis 2.1 fails. Then given d and N we can distinguish between RSA-ciphertexts $x^d \pmod{N}$ of random messages $x \in [1,N]$ and of random messages $x \in [1,M_n]$ for some $M_n = \theta(2^l)$.

Proof The transformation $x \rightarrow x^d \pmod{N}$ permutes the integers in the interval $[1,N]$. The RSA-enciphering $x^d \pmod{N}$ of random messages $x \in [1,N]$ is uniformly distributed over $[1,N]$. If Hypothesis 2.1 fails the uniform distribution can be distinguished from RSA-ciphertexts $x^d \pmod{N}$ for random $x \in [1,M_n]$; i.e. RSA-ciphertexts $x^d \pmod{N}$ would leak information on whether the message x is contained in $[1,M_n]$. QED We do not claim that the RSA-scheme breaks down if the hypothesis fails. This is because messages in the interval $[1,2^l]$ are rather unlikely. Nevertheless the hypothesis is close to the security of the RSA-scheme. Using the following Theorem 2.3 we can relate the hypothesis to RSA-security (see Corollary 2.5).

Theorem 2.3 Alexi, Chor, Goldreich, Schnorr (1985)

Let d,N be integers such that $\gcd(d,\phi(N)) = 1$. Every probabilistic algorithm AL, which given the RSA-enciphering $x^d \pmod{N}$ of a message x, has an $\epsilon_N$-advantage in guessing the least significant bit of the message x can be transformed (uniformly in N) into a probabilistic algorithm $\overline{AL}$ for deciphering arbitrary RSA-ciphertexts. The deciphering algorithm $\overline{AL}$, when given for input $x^d \pmod{N}$, d and N, terminates after at most $$O(\epsilon_N^{-8} n^3)$$

elementary steps and outputs x with probability at least $\frac{1}{2}$.

We count for elementary steps the $\mathbb{Z}_N$ operations (addition, multiplication, division), RSA-encryptions and calls for algorithm AL at unit cost. We say that algorithm AL has an $\epsilon_N$-advantage in guessing the least significant bit of x if $$\text{prob}[AL(x^d \pmod N), N) = x \pmod 2] \geq \frac{1}{2} + \epsilon_N.$$

The probability space is the set of all $x \in [1,N]$ and all 0-1 sequences of internal coin tosses, with uniform probability.

By Theorem 2.3 the security of the RSA-scheme with parameters N, d implies that the following two distributions cannot be distinguished given only N and d:
the uniform distribution on $[1,N]$,
$x^d \pmod{N}$ for random, even $x \in [1,N]$.
Everyone who is able to distinguish these distributions can decode arbitrary RSA-ciphertexts $x^d \pmod{N}$ given only N and d. We will present in Corollary 2.4 a more formal version of this statement.

We say that a probabilistic algorithm AL $\epsilon_N$-rejects the distribution D on $[1,N]$ if $$|p^A - p^{-A}| \geq \epsilon_N$$

where $$p^A - (p^{-A},$$

(resp.) is the probability that AL on input $y \in [1,N]$ outputs 1. The probability space is the set of all $y \in [1,N]$, distributed according to D (with uniform distribution, resp.) and of all 0-1 sequences of internal coin tosses of algorithm AL. Using this notion we can reformulate Theorem 2.3 as follows.

Corollary 2.4 Let d, N be integers such that $\gcd(d,\phi(N)) = 1$. Every probabilistic algorithm AL, that $\epsilon_N$-rejects RSA-ciphertexts $x^d \pmod{N}$ of even random messages x can be transformed (uniformly in N) into a probabilistic algorithm for decoding arbitrary RSA-ciphertexts. This deciphering algorithm terminates after at most $$O(\epsilon_N^{-8} n^3)$$

elementary steps (i.e. $N$ operations, RSA encryptions and calls for AL).

We next show that Corollary 2.4 remains valid if we replace RSA-ciphertexts of random even messages x, by RSA-ciphertexts of random messages $x \in [1,N/2]$.

Corollary 2.5 Let d, N be odd integers such that $\gcd(d,\phi(N)) = 1$. Every probabilistic algorithm AL, that $\epsilon_N$-rejects RSA-ciphertexts $x^d \pmod{N}$ of random messages $x \in [1,N/2]$ can be transformed (uniformly in N) into a probabilistic algorithm for decoding arbitrary RSA-ciphertexts. This deciphering algorithm terminates after at most $$O(\epsilon_n^{-8} n^3)$$

elementary steps.

Proof For odd N and all $x \in [1,N]$ we have $$x \in [1,N/2] \leftarrow 2x \pmod{N} \text{ is even.}$$

We see from this equivalence that the following distributions are identical for odd N:
.$x^d \pmod{N}$ for random $x \in [1,N/2]$,
.$2^{-d} y^d \pmod{N}$ for random even $y \in [1,N]$.
Moreover we can transform in polynomial time $y^d \pmod{N}$ into $2^{-d} y^d \pmod{N}$. Thus an $\epsilon_N$-rejection of RSA-encipherings $x^d \pmod{N}$ of random messages $x \in [1,N/2]$ can be transformed (uniformly in N) into an $\epsilon_N$-rejection of RSA-ciphertexts $y^d \pmod{N}$ of random even $y \in [1,N]$. Corollary 2.5 follows from Corollary 2.4 by this transformation.

Under the assumption that the RSA-scheme is safe Corollary 2.5 proves a slight modification of our hypothesis. The interval $[1,2^l]$ of Hypothesis 2.1 is replaced by the interval $[1,N/2]$ in this modification. This poses the question whether the length of the interval is crucial for the hypothesis to be valid. We next show that Hypothesis 2.1, with the interval $[1,2^l]$ replaced by the interval $$[1, N\, 2^{-[\log n]}],$$

is valid if the RSA-scheme is safe.

Theorem 2.6 Let d, N be odd integers such that $\gcd(d,\phi(N)) = 1$. Every probabilistic algorithm AL, that $\epsilon_N$-rejects RSA-ciphertexts $x^d \pmod{N}$ of random messages $x \in [1, N2^{-k}]$ can be transformed (uniformly in N) into a probabilistic algorithm for decoding arbitrary RSA-ciphertexts. This deciphering algorithm terminates after at most $$O(2^{2k} \epsilon_N^{-8} n^3)$$

elementary steps.

Proof Under the assumption that the RSA-scheme is safe, Alexi et alii (1985) have shown that the log n least significant bits of RSA-messages x are pseudo-random when given $x^d$(mod N), d and N. Their proof transforms every algorithm that $\epsilon_N$-rejects RSA-encipherings $x^d$(mod N) of random messages x satisfying x=0(mod $2^k$), (uniformly in N) into a probabilistic algorithm for deciphering arbitrary RSA-ciphertexts. This RSA-deciphering procedure terminates after at most $$O(2^{2k} \epsilon_N^{-8} n^3)$$

elementary steps (i.e. $\mathbb{Z}_N$-operations, RSA-encipherings and calls for algorithm AL).

For odd N and all $x\epsilon[1,N]$ we obviously have $$x\epsilon[1,N2^{-k}] \leftrightarrow 2^k x(\text{mod } N) = 0(\text{mod } 2^k).$$

Therefore the following two distributions are identical for odd N:

$x^d$(mod N) for random $x\epsilon[1,N2^{-k}]$, $2^{-kd}y^d$(mod N) for random $y\epsilon[1,N\ 2^{-k}]$ satisfying y=0(mod $2^k$).

Moreover we can transform in polynomial time $y^d$(mod N) into $2^{-kd}y^d$(mod N). Thus an $\epsilon_N$-rejection of RSA-ciphertexts $x^d$(mod N) of random messages $x\epsilon[1,N\ 2^{-k}]$ can be transformed (uniformly in N) into an $\epsilon_N$-rejection of RSA-ciphertexts $y^d$(mod N) of random messages y satisfying y=0(mod $2^k$). Corollary 2.6 follows from this transformation and the above mentioned proof of Alexi et alii (1985).

Notice that the time bound for the RSA-deciphering algorithm of Corollary 2.6 is polynomially related to the time bound of algorithm AL provided that k≦log n. Hence if Hypothesis 2.1 fails, with the interval $[1,2^l]$ replaced by the interval $[1, N2^{-\lceil \log n \rceil}]$, then RSA-ciphertexts can be deciphered in polynomial time. Also if Hypothesis 2.1 fails, with the interval $[1,2^l]$ replaced by the interval $$[1, N2^{-\sqrt{n}}],$$

then RSA-ciphertexts can be deciphered in time $$e^{\alpha\sqrt{n}}.$$

However the fastest known algorithm for RSA-deciphering, via factoring N, requires about $$e^{0.693\sqrt{n \log n}}$$

steps, where $0.693 \approx \log 2$. Thus if Hypothesis 2.1 fails for the interval $$[1, N2^{-\sqrt{n}}],$$

then we can speed up the presently known attacks to the RSA-scheme.

It remains the question whether the computational properties of the distribution $x^d$(mod N) change when x ranges over very small integers x. In fact Hypothesis 2.1 does not hold for the interval $[1,N^{1/d}]$ since we have $x^d < N$ for all $x\epsilon[1,N^{1/d}]$ and therefore RSA-ciphertexts $x^d$(mod N) can easily be deciphered for $x\epsilon[1,N^{1/d}]$. On the other hand the d-powers $x^d$ are of order $N^2$ for almost all numbers $x\epsilon[1,2^l]$. We conjecture that this is sufficient to make the task of deciphering $x^d$(mod N) hard. This is justified because inverting the squaring $$x \to x^2(\text{mod } N)$$

is known to be as hard as factoring N, and the squares $x^2$ are of order $N^2$, too.

We are going to study the question whether Hypothesis 2.1 should be extended to polynomials P(x) that are more general than RSA-polynomials $P(x)=x^d$ with gcd(d,$\phi$(N))=1. There is an obvious extension of Hypothesis 2.1 to arbitrary exponents d≧2. It seems that the condition gcd(d,$\phi$(N))=1 is not necessary for odd d. But we must modify the hypothesis for even d since the Jacobi-symbol gives efficient information on the quadratic residuosity. We formulate the extended hypothesis so that it can be applied in the proof of Theorem 3.1 to establish perfect RNG's. For reasons of efficiency we are particularly interested in even exponents d and in exponents that are powers of 2.

Extension to even d of Hypothesis 2.1: For random $N\epsilon S_n$, all $M=\theta(2^l)$, random $x\epsilon[1,M]$ and $y:=x^d$(mod N), $z:= \lceil y/2^{n-l} \rceil$ the following holds.

(1) y and $z^d$(mod N) are pseudo-random quadratic residues,
(2) the number y(mod $2^{n-l}$) is pseudo-random in $[1,2^{n-l}]$,
(3) $z^d$(mod N) and y(mod $2^{n-l}$) are pseudo-independent.

The extended hypothesis can be justified by the work of Alexi et alii (1984) for the case that N is a Blum-integer, i.e. N is product of two primes p and q such that p=3(mod 4) and q=3(mod 4). Roughly speaking, it does not matter that $y=x^d$(mod N) ranges over quadratic residues. None of the disjoint parts z and y(mod $2^{n-l}$) of y contains efficient information on the quadratic residuosity of $x^d$(mod N). The dependence of z and y(mod $2^{n-l}$), by the quadratic residuosity of y, is hidden by the transformation $z \to z^d$(mod N).

Next we consider arbitrary polynomials P(x) of degree d. We are going to show that some elementary methods for distinguishing random numbers $y\epsilon[1,N]$ and P(x) mod N for random $x\epsilon[1,N^{2/d}]$ do not work. Theorem 2.7 is a first step in this direction. This problem clearly deserves further study.

In general we can invert the transformation $$x \to P(x) \text{ mod } N \qquad (1)$$

only if the factorization N=pq is given. Then, using Berlekamps algorithm for polynomial factorization we invert (1) modulo p and modulo q and apply the Chinese remainder construction. This can be done in probabilistic time $(nd)^{o(1)}$. Without knowing the factorization of M we do not know how to invert (1). We can however invert factors P(x) of $x^{\phi(N)}$ provided that we know the cofactor $x^{\phi(N)}/P(x)$ but then we can factor N.

Can we invert (1) for small integers x? If $|P(x)|/N$ is small we can guess $z = P(x)$ and factorize $P(x) - z$. Theorem 2.7 below shows that $|P(x)|/N$ is large for almost all $x \epsilon [1, N^{2/d}]$ provided that P(x) has degree $\leq N^{1/2d}$. This degree bound is necessary since there exist polynomials of degree $N^{2/d}$ that vanish on the intervall $[1, N^{2/d}]$.

Theorem 2.7 Let A,B,d be integers such that $M \geq (BN)^{1/d} 16Ad$, and let $P(x) \epsilon$ [x] have degree d. Then we have $\text{prob}[|P(x)| \leq BN] \leq 1/A$ for random $x \epsilon [1, M]$.

Proof Let $x_1, \ldots, x_k$ be the distinct real numbers in [0,N] satisfying $P(x_i)^2 = B^2 N^2$ for $i = 1, \ldots, k$. We have $k \leq 2d$ since $P(x)^2$ has degree 2d. We partition the real interval [0,M] into 4Ad intervals of length M/(4Ad). A fundamental theorem in approximation theory (see e.g. Stiefel (1969), p. 236) implies that $$\max[P(x)^2 | x \epsilon I] \geq \left(\frac{M}{8Ad}\right)^{2d} 2^{-2d+1}$$

for each of these intervals I. Hence $$\max[|P(x)| | x \epsilon I] > \left(\frac{M}{16Ad}\right)^{d} \geq BN.$$

This shows that every interval I, that contains an integer x satisfying $|P(x)| \leq BN$, must also contain some point $x_i$, $1 \leq i \leq k \leq 2d$. The intervals I that contain some point $x_i$ can have at most $$2d \left(\frac{M}{4Ad} + 1\right) \leq \frac{M}{2A} + 2d$$

integer points. This accounts for at most a fraction of $$\frac{1}{2A} + \frac{2d}{M} \leq 1/A$$

of the points in [1, M].

The Sequential and the Parallel Polynomial Generator

In this section we build several RNG's on polynomials P(x) of degree $d \geq 2$ that have the following generator property. The generator property formulates Hypothesis 2.1 for arbitrary polynomials P(x).

Definition The polynomial P(x) has the generator property if for random $N \epsilon S_n$, all M proportional to $N^{2/d}$ and random $x \epsilon [1, M]$ the number P(x) mod N is pseudo-random in [1,N].

The generator property means that P stretches random seeds $x \epsilon [1, N^{2/d}]$ into pseudo-random numbers P(x) mod N in the interval [1,N]. By Hypothesis 2.1 RSA-polynomials $P(x) = x^d$ with $\gcd(d, \phi(N)) = 1$ and $d \geq 3$ have the generator property.

The sequential polynomial generator (SPG) generates a sequence of numbers $x = x_1, x_2, \ldots, x_i, \ldots,$ in $[1, N^{2/d}]$ that are represented by bit strings of length $l := \lfloor 2n/d \rfloor$. The output at $x_i$, $\text{Out}(x_i) \epsilon \{0,1\}^{n-l}$, is the bit string consisting of the $n - l$ least significant bits of the binary representation of $P(x_i)$ mod N. The successor $x_{i+1}$ of $x_i$ is the number corresponding to the other bits of $P(x_i)$ mod N, $$x_{i+1} := \lfloor P(x_i) \bmod N/2^{n-l} \rfloor.$$

Figure 6:
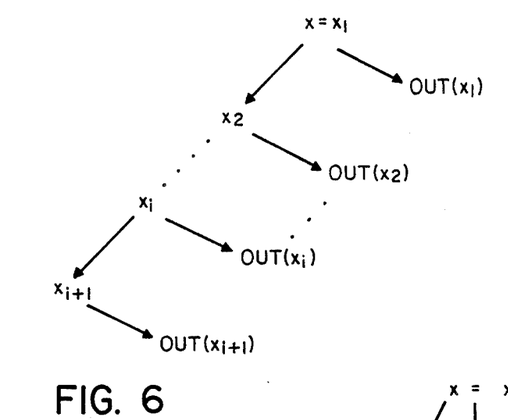
FIG. 6 is another illustration of a sequential polynomial generator.

The sequential polynomial generator as illustrated in FIG. 6.

Let the k-output of the SPG $$SPG_{k,P}(x,N) = \prod_{i=1}^{k} \text{Out}(x_i)$$

be the concatenated output of the first k steps.

Notice that the most significant bits of $P(x_i)$ mod N are biased depending on the most significant bits of N. Even though the most significant bits of $P(x_i)$ mod N are not pseudo-random we can form from these bits the successor $x_{i+1}$ of $x_i$. This is because the generator property and Hypothesis 2.1 imply that $P(x_i)$ mod N is pseudo-random for random numbers $x_i \epsilon [1, M]$ for all M proportional to $2^l$. We could fix M to $2^l$ if the SPG would not use at all the l most significant bits of $P(x_i)$ mod N, and would form $\text{Out}(x_i)$ and $x_{i+1}$ from the $n - 1$ least significant bits.

Theorem 3.1 Suppose that P has the generator property. Then for random $N \epsilon S_n$, random $x \epsilon [1, N^{2/d}]$ and polynomially bounded k (i.e. $k = k(n) = n^{O(1)}$) the k-output $SPG_{k,P}(x,N)$ of the sequential polynomial generator is pseudo-random.

Proof For random $N \epsilon S_n$ and random $x_1 \epsilon [1, N^{2/d}]$ the number $P(x_1)$ mod $N \epsilon [1,N]$ is pseudo-random. It follows that the bit string $\text{Out}(x_1) \epsilon \{0,1\}^{n-l}$ is pseudo-random and that the number $x_2 \epsilon [1, 2^l]$ is pseudo-random. We also see that the pair $(\text{Out}(x_1), x_2)$ is pseudo-random. It follows from the generator property and since $x_2$ is pseudo-random that $$(\text{Out}(x_1)\text{Out}(x_2), x_3) = (SPG_{2,P}(x_1,N), x_3)$$

is pseudo-random, too. To prove this claim we replace in a statistical test $T = (T_n)_{n\epsilon}$ for $z := (\text{Out}(x_1) \text{Out}(x_2), x_3)$ either $(\text{Out}(x_2), x_3)$ or $\text{Out}(x_1)$ by independent random objects generated through internal coin tosses. This transforms T into statistical test for $P(x_2)$ mod N ($P(x_1)$ mod N, resp.). If z is $\epsilon_n$-rejected then either $P(x_2)$ mod N or $P(x_1)$ mod N is $(\epsilon_n/2)$-rejected. In either case this yields a statistical test that $(\epsilon_n/2)$-rejects $P(x_1)$ mod N.

By induction on k the same argument proves that $$(SPG_{k,P}(x_1,N), x_{k+1})$$

is pseudo-random for every fixed k. The pseudo-randomness also holds if $k = k(n)$ depends on n if k is polynomially bounded in n, i.e. $k = n^{o(1)}$. Using the above argument we can transform a test that $\epsilon_n$-rejects $(SPG_{k,P}(x_1,N), x_{k+1})$ into a test that $(\epsilon_n/k)$-rejects $P(x_1)$ mod N.

It is important that the above proof also applies to polynomials $P(x) = x^d$ with even d. Instead of using the generator property of P we can use the extension to even d of Hypothesis 2.1. Speaking informally, it does not hurt that $x^d$(mod N) ranges over quadratic residues since the output merely contains the least significant bits of $x^d$(mod N) and these bits give no efficient information on the quadratic residuosity of $x^d$(mod N). Thus we can use for random bit generation the polynomial $P(x)=x^{16}$ which yields particular efficient generators.

PRACTICAL POLYNOMIAL GENERATORS

For practical applications let N be a fixed product of two random primes p and q which each is 256 bits long. $N^{2/d}$ must be so large that it is infeasible to enumerate a non-negligible part of $[1,N^{2/d}]$. We recommend that $d \leq 16$ so that $N^{2/d} \geq 2^{64}$.

EXAMPLE 1

Let N be n=512 bits long and let $\gcd(15,\phi(N))=1$. We choose $d=15$, $P(x)=x^{15}$. Let $Out(x_i)$ consist of the 440 least significant bits of $P(x_i)$ mod N and let $x_{i+1}$ be the number corresponding to the 68 most significant bits of $P(x_i)$ mod N. We compute $x^{15}$(mod N) by computing $x^2$, $x^4$, $x^8$, $x^7=x^4 \cdot x^2 \cdot x$ and $x^{15}=x^8 \cdot x^7$(mod N). Only the last multiplication requires modular reduction. The other multiplications are with small numbers. The costs of one iteration step correspond to one full modular multiplication. Thus this SPG iteratively outputs 440 pseudo-random bits at the cost of one full modular multiplication with a modulus that is 512 bits long.

EXAMPLE 2

Another suitable polynomial is $P(x)=x^{16}$ even though this polynomial does not have the generator property. The computation of $x^{16}$(mod N) is particularly easy; we compute $x^2$, $x^4$, $x^8$ and $x^{16}=x^8 \cdot x^8$ (mod N). The SPG with $P(x)=x^{16}$ iteratively outputs 448 bits at the cost of one full modular multiplication with a modulus N that is 512 bits long.

Next we are going to extend the SPG to a generator which we can speed by parallelization. The parallel polynomial generator (PPG) generates from random seed $x \epsilon [1,N^{2/d}]$ a tree with root x and outdegree at most $d/2$. The nodes of this iteration tree are pseudo-random numbers in $[1,N^{2/d}]$ that are represented by bit strings of length l.

The successors $y(1),\ldots,y(s)$ of a node y with degree s and the output string $Out(y)$ at y are defined as follows. Let $b_1,\ldots,b_n$ be the bits of the binary representation of $P(y)$ mod N, with $b_1$ being the most significant bit, i.e.

$$\sum_{i=1}^{n} b_i 2^{n-i} = P(y) \bmod N.$$

We partition the sl most significant bits into s block with l bits in each block. The corresponding numbers $$y(j):= 1 + \sum_{i=1}^{l} b_{(j-1)l+i} 2^{l-i} \text{ for } j=1,\ldots,s$$

are the successors of node y in the iteration tree. The output $Out(y)$ at node y consists of the remaining low order bits of $P(y)$ mod N, $$Out(y)=b_{sl+1}\ldots b_n.$$

For convenience we denote the nodes on level k of the iteration tree as $x(j_1,\ldots,j_k)$; $x(j_1,\ldots,j_{k-1})$ is the direct predecessor of $x(j_1,\ldots,j_k)$ and $j_k$ ranges from 1 to $s_{k-1}$="outdegree of $x(j_1,\ldots,j_{k-1})$". For simplicity we let the outdegree of node $x(j_1,\ldots,j_k)$ be a function depending on k only; we assume that $s_k \geq 1$.

Figure 7:
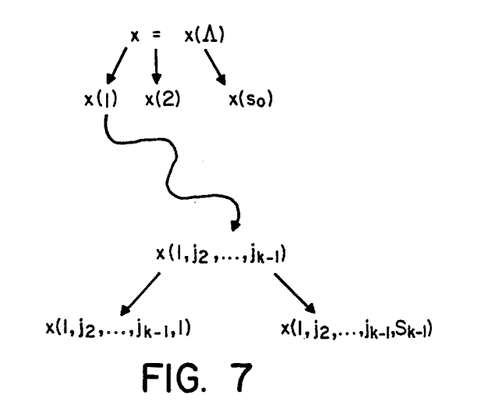
FIG. 7 is another illustration of a parallel polynomial generator.

The parallel polynomial generator can be figured by the infinite tree of FIG. 7.

We define the k-output $PPG_{k,P}(x,N)$ of the PPG with seed x as the concatenation of all bit strings $Out(x(j_1,\ldots,j_i))$ on levels i with $0 \leq i \leq k$, with respect to any efficient enumeration order, as e.g. preorder traversal, postorder traversal, inorder traversal or enumeration by levels.

In the particular case that all outdegrees are one, i.e. $s_0=s_1=\ldots=s_k=1$, the parallel and the sequential polynomial generator coincide. The argument of Goldreich, Goldwasser and Micali (1986) extends Theorem 3.1 from the SPG to arbitrary PPG's, provided that we process at most polynomially many nodes in the iteration tree. This yields the following theorem.

Theorem 3.2 Suppose that P has the generator property. Then for random $N \epsilon S_n$, random $x \epsilon [1,2^l]$ the k-output $PPG_{k,P}(x,N)$ of the parallel polynomial generator is pseudo-random provided that the length of $PPG_{k,P}(x,N)$ is polynomially bounded.

Idea of proof

There is a straightforward way to extend the proof of Theorem 3.1. Suppose that the k-output $PPG_{k,P}(x,N)$ collects the outputs of $\bar{k}$ nodes. Then every statistical test that $\epsilon_n$-rejects $PPG_{k,P}(x,N)$ for random $x \epsilon [1,N^{2/d}]$ and random $N \epsilon S_n$ can be transformed into a statistical test that $(\epsilon_n/\bar{k})$-rejects $P(x)$ mod N.

For the output of the PPG we can use any efficient enumeration for the nodes of the iteration tree. To support parallel evaluation we can adjust the shape of the iteration tree and the enumeration order to the number of available parallel processors. In Example 3 we form, for 8 parallel processors, an iteration tree consisting of 8 rays attached to the root; the nodes are enumerated by levels and within levels from left to right. For m parallel processors we can use any iteration tree consisting of m isomorphic subtrees attached to the root; we can enumerate, in any order, the m-tuples of corresponding nodes in these subtrees. The enumeration within the subtrees can be chosen to support fast retrieval; for this we can enumerate the nodes e.g. in preorder traversal or in inorder traversal. It is an obvious but important observation that m processors can speed the pseudo-random bit generation of the PPG by a factor m. Once we are given m nodes on the same level of the iteration tree we can process the subtrees below these nodes independently by m parallel processors. These processors do not need to communicate.

Corollary 3.3 Using m processors in parallel we can speed the pseudo-random bit generation of the parallel polynomial generator by a factor m.

PRACTICAL PARALLEL POLYNOMIAL GENERATORS

Let N be product of two random primes so that N is 512 bits long. Let $P(x)=x^{16}$.

EXAMPLE 3

Figure 8:
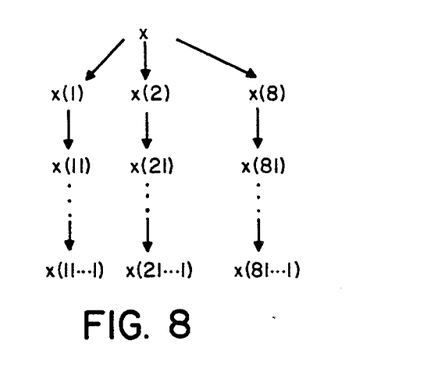
FIG. 8 is an illustration of yet another parallel polynomial generator.

We construct from random $x \epsilon [1,2^{64}]$ a tree with 8 nodes per level. (FIG. 8)
1. Stretch a random seed $x \epsilon [1,2^{64}]$ into $x^{16}$(mod N).
2. Partition the binary representation of $x^{16}$(mod N) into 8 bit strings $x(1),\ldots,x(8)$ of length 64. Put $k=1$ and let $PPG_{1,P}(x,N)$ the empty string.
3. For $j=1,\ldots,8$ let $x(j\ 1^k) \epsilon I_{64}$ consist of the 64 most significant bits of the binary representation of $x(j\ 1^{k-1})^{16}$ mod N, and let $Out(x(j\ 1^k)) \epsilon I_{448}$ consist of the remaining 448 least significant bits.
4.

$$PPG_{k+1,P}(x,N) = PPG_{k,P}(x,N) \prod_{j=1}^{8} \text{Out}(x(j\ 1^k))$$

$k := k + 1$, go to 3.

Using 8 parallel processors this PPG iteratively generates $8 \cdot 448 = 3584$ pseudo-random bits in the time for one full modular multiplication with a modulus N that is 512 bits long. With current processors for smart cards such a full modular multiplication can be done in less than 0.2 sec. Thus 8 parallel processors can generate about 18000 pseudo-random bits per sec.

EXAMPLE 4

We construct from random $x \epsilon [1, 2^{64}]$ a complete tree of outdegree 4.
1. Choose a random seed $x \epsilon [1, 2^{64}]$ for root of the tree.
2. For every node $y \epsilon [1, 2^{64}]$ of the tree compute the successors $y(1), \ldots, y(4)$ and the output $\text{Out}(y)$ of $y^{16} (\text{mod } N)$ by partitioning the binary representation B of $y^{16}(\text{mod } N)$ as $$B = B_1 B_2 B_3 B_4\ \text{Out}(y) \epsilon I_{64}^4 \times I_{256}$$

and compute for $i = 1, \ldots, 4$ $y(i) := 1 +$ "the number with binary representation $B_i$".

The main interest in such a PPG comes from fast retrieval methods.

Fast retrieval for the PPG: If the PPG has a complete iteration tree one can efficiently retrieve substrings of the output. Consider example 4 with a complete iteration tree of outdegree 4. Level k of the tree has $4^k$ nodes and the first k levels have about $4^k \cdot 5/4$ nodes in total. Suppose the nodes of the tree are enumerated in preorder traversal. Each node yields 256 output bits. To retrieve node y we follow the path from the root to y. This requires processing and storage of at most k nodes and can be done at the costs of about k full modular multiplications. Once we have retrieved node y and stored the path from the root to node y, the bit string that follows $\text{Out}(y)$ in the output can be generated by standard methods at the speed of 256 bits per modular multiplication. For most practical applications the depth k will be at most 30 which permits to generate a pseudo-random string that is $3.7 \cdot 10^{20}$ bits long. We see that retrieval of substrings is very efficient, it merely requires a preprocessing stage of a few seconds to retrieve the initial segment of the substring.

Theorem 3.4 Every node y of depth k in the iteration tree of the PPG can be accessed and processed at the costs of $O(k)$ modular multiplications.

TABLE

| | retrieval performance of the PPG, example 4 | | | | | |
|---|---|---|---|---|---|---|
| k | 5 | 10 | 15 | 20 | 25 | 30 |
| # nodes in The first k levels | 1280 | $1.3 \cdot 10^6$ | $1.3 \cdot 10^9$ | $1.3 \cdot 10^{12}$ | $1.4 \cdot 10^{15}$ | $1.4 \cdot 10^{18}$ |
| # output bits | $3.3 \cdot 10^5$ | $3.3 \cdot 10^8$ | $3.4 \cdot 10^{11}$ | $10^{14}$ | $3.6 \cdot 10^{17}$ | $3.7 \cdot 10^{20}$ |

Parallelization and fast retrieval for arbitrary perfect RNG's

It is an important observation that the above methods of parallelization and of efficient retrieval apply to every perfect RNG $(G_n)_{n \epsilon \mathbb{N}}$. The parallel version of the generator associates an iteration tree to a random seed. For example let $G_n: I_n \rightarrow I_{3n}$ stretch a random strings in $I_n$ into pseudo-random strings in $I_{3n}$. We construct from random seed $x \epsilon I_n$ a binary iteration tree with nodes in $I_n$. Let x be the root of the tree. Construct the two successors $y(1), y(2)$ and the output $\text{Out}(y)$ of node y by partitioning $G_n(y) \epsilon I_{3n}$ into three substrings of length n, $$G_n(y) = y(1) y(2)\ \text{Out}(y).$$

Let $PG_{k,G}(x)$ be the concatenated output of all nodes with depth at most k (compare with the definition of $PPG_{k,P}(x,N)$).

Theorem 3.5 Let $(G_n)_{n \epsilon \mathbb{N}}$ be any perfect RNG. Then for random seed $x \epsilon I_n$ the concatenated output $PG_{k,G}(x)$ of all nodes with depth $\leq k$ is pseudo-random provided that its length is polynomially bounded in n.

We illuminate our method of parallelization in applying it to some less efficient versions of the RSA/Rabin generator. Let N be a product of two random primes such that N is 512 bits long and $\gcd(3, \phi(N)) = 1$.

EXAMPLE 5

From random seed $x \epsilon [1, N]$ we generate the sequence of numbers $x_1, x_2, \ldots, x_i, \ldots \epsilon [1, N]$ as $$x_1 = x,\ x_{i+1} = x_i^3 (\text{mod } N).$$

Under the assumption that the RSA-enciphering $x \rightarrow x^3 (\text{mod } N)$ is safe for the particular N, Alexi et alii (1984) have shown that about the 16 least significant bits of $x_i$ are pseudo-independent from $x_{i+1}$. This suggest the following output of $x_i$ $\text{Out}(x_i) = $ "the 16-least significant bits of $x_i$".

Thus for random $x_1 \epsilon [1, N]$ and under the assumption that RSA-enciphering is safe we obtain pseudo-random bit strings $$\prod_{i=1}^{100} \text{Out}(x_i)$$

of length 1600. We apply a binary tree construction to the function $$G: I_{512} \rightarrow I_{1600}$$

that stretches the binary representation of $x_1 \epsilon [1, N]$ into $$\prod_{i=1}^{100} \text{Out}(x_i).$$

The binary tree has nodes in $I_{512}$. The successors $y(1), y(2)$ and the output of node y are obtained by partitioning $G(y)$ into two successor strings of length 512 and an output string $\text{Out}_G(y) \epsilon I_{576}$. Processing a node of the binary iteration tree costs 200 modular multiplication.

EXAMPLE 6

We can accelerate this generator under the reasonable assumption that the 448 least significant bits of random $x \in [1,N]$ and the number $x^3 \pmod{N}$ are pseudo-independent. We set Out($x_i$):="the 448 least significant bits of $x_i$", and it follows that $$\prod_{i=1}^{3}$$

Out($x_i$)$\in I_{1344}$ is pseudo-random for random $x_1 \in [1,N]$. We apply the binary tree construction to the function $$G: I_{512} \rightarrow I_{1344}$$

that stretches the binary representation of $x_1 \in [1,N]$ into $$\prod_{i=1}^{3}$$

Out($x_i$). The successors $y(1), y(2) \in I_{512}$ and the output Out$_G(y) \in I_{320}$ of node $y$ are obtained by partitioning $G(y) \in I_{1344}$ into two strings in $I_{512}$ and Out$_G(y) \in I_{320}$. Processing a node of the binary tree costs 6 modular multiplications.

EXAMPLE 7

We can further speed up this generator under the assumption that the 448 least significant bits of random $x \in [1,N]$ are pseudo-independent of $x^2 \pmod{N}$. (It follows from Alexi et alii (1984) that the 16 least significant bits of random $x \in [1,N]$ are pseudo-independent of $x^2 \pmod{N}$ if factoring the particular N is hard. Under this assumption we can replace the iteration $$x_i := x_{i+1}^3 \pmod{N}$$

by $$x_{i+1} := x_i^2 \pmod{N}.$$

As in Example 5 we associate with a random $x \in [1,N]$ a binary iteration tree with nodes in $I_{512}$. Processing a node of this tree costs about 4 modular multiplications and yields 320 pseudo-random bits for output.

It is interesting to compare the efficiency of these parallel RNG's with the parallel RNG's based on Hypothesis 2.1. For the latter RNG's in examples 1-4 the cost per node of the iteration tree is about 1 mulitplication modulo N. This shows that the new perfect RNG's are more suitable for our method of parallelization and fast retrieval.

References

Alexi, W., Chor, B., Goldreich, O., and Schnorr, C. P.: RSA and Rabin Functions: certain parts are as hard as the whole. Proceeding of the 25th Symposium on Foundations of Computer Science, 1984, pp. 449-457; also; Siam Journal on Comput., (1988).

Blum, L., Blum, M. and Shub, M.: A simple unpredictable pseudo-random number generator. Siam J. on computing (1986), pp. 364-383.

Blum, M. and Micali, S.: How to generate cryptographically strong sequences of pseudo-random bits. Proceedings of the 25th IEEE Symposium on Foundations of Computer Science, IEEE, New York (1982); also Siam J. Comput. 13 (1984), pp. 850-864.

Goldreich, O., Goldwasser, S., Micali, S.: How to Construct Random Functions. Proceedings of the 25th IEEE Symposium on Foundations of Computer Science, IEEE, New York, (1984); also Journal ACM 33,4 (1986), pp. 792-807.

Knuth, D. E.: The Art of Computer Programming. Vol. 2, second edition. Addison Wesley (1981).

Luby, M. and Rackoff, Ch.: Pseudo-random permutation generators and cryptographic composition. Proceedings of the 18th ACM Symposium on the Theory of Computing, ACM, New York (1985) pp. 356-363.

Stern, J.: Secret linear congruential generators are not cryptographically secure. Proceedings of the 28th IEEE-Symposium on Foundations of Computer Science (1987) pp. 421-426.

Stiefel, E.: Einführung in die numerische Mathematik. Teubner, Stuttgart (1969).

Yao, A. C.: Theory and applications of trapdoor functions. Proceedings of the 25th IEEE Symposium on Foundations of Computer Science, IEEE, New York (1982), pp. 80-91.

While this invention has been particularly shown and described with references to preferred embodiments thereof, it will be understood by those skilled in the art that various changes in form and details may be made therein without departing from the spirit and scope of the invention as defined by the appended claims.

We claim:

1. A random sequence generator for generating a random sequence from a seed random sequence of substantially shorter length, the generator performing a tree operation by extending, at each node of a tree structure, a node input random sequence into a longer node output random sequence, a plurality of node output random sequences of the tree structure together comprising a final random output sequence.

2. A random sequence generator as claimed in claim 1 wherein each node input sequence is extended by the operation $$y = a_e x^e + a_{e-1} x^{e-1} + \ldots + a_1 x + a_0 \pmod{N}$$

where $e, a_e, a_{e-1}, \ldots, a_0$ and N are integers, the node input sequence represents x and the node output sequence represents y.

3. A random sequence generator as claimed in claim 2 wherein there is at least one $a_d$ of $a_e$, $a_{e-1}, \ldots, a_3$ not equal to zero and the greatest common divisor of d and $\phi(N)$ is equal to one where $\phi(N)$ is Euler's Totient function.

4. A random sequence generator as claimed in claim 2 where N is the product of two large random primes p and q.

5. A random sequence generator as claimed in claim 4 wherein at least one $a_d$ of $a_e, a_{e-1}, \ldots, a_3$ is nonzero, and d is an integer that is relatively prime to $(p-1)(q-1)$.

6. A random sequence generator as claimed in claim 5 wherein all coefficients of the polynomial of y are equal to zero except the coefficient $a_3$.

7. A random sequence generator as claimed in claim 6 where $a_3$ is equal to one.

8. A random sequence generator as claimed in claim 1 wherein each node input sequence is extended by the operation $$y = ax^d \pmod{N}$$

where N is the product of two large random primes p and q, d is an integer that is relatively prime to $(p-1)(q-1)$, the node input sequence represents x and the node output sequence represents y.

9. A random sequence generator as claimed in claim 8 wherein d is equal to 3.

10. A random sequence generator as claimed in claim 1 wherein each node input sequence is extended by a single modular operation.

11. A random sequence generator as claimed in claim 1 wherein less than all of the bits of node output sequences are reapplied as node input sequences of the tree structure.

12. A random sequence generator for generating a random sequence from a seed random sequence of substantially shorter length, the generator performing a tree operation by extending, at each node of a tree structure, a node input random sequence into a longer node output random sequence, a final random output sequence being generated as successive leaves of the tree structure.

13. A random sequence generator as claimed in claim 12 wherein each node input sequence is extended by the operation $$y = ax^d \pmod{N}$$

where N is the product of two large random primes p and q, d is an integer that is relatively prime to $(p-1)(q-1)$, the node input sequence represents x and the node output sequence represents y.

14. A random sequence generator as claimed in claim 13 wherein d is equal to 3.

15. A random sequence generator as claimed in claim 12 wherein each node input sequence is extended by a single modular operation.

16. A random sequence generator as claimed in claim 12 wherein each node input sequence is extended by the operation $$y = a_e x^e + a_{e-1} x^{e-1} + \ldots + a_1 x + a_0 \pmod{N}$$

where $e, a_e, a_{e-1}, \ldots, a_0$ and N are integers, the node input sequence represents x and the node output sequence represents y, and where there is at least one $a_d$ of $a_e, a_{e-1}, \ldots, a_3$ not equal to zero and the greatest common divisor of d and $\phi(N)$ is equal to one where $\phi(N)$ is Euler's Totient function.

17. A random sequence generator for generating a random sequence from a seed random sequence of substantially shorter length, the generator comprising a plurality of processors, each processor extending a node input random sequence into a longer node output random sequence, each of the plurality of processors performing a portion of a tree structure by extending a node input sequence and then separately extending different portions of a node output sequence in successive operations at successive nodes of the tree structure.

18. A random sequence generator as claimed in claim 17 wherein each node input sequence is extended by the operation $$y = ax^d \pmod{N}$$

where N is the product of two large random primes p and q, d is an integer that is relatively prime to $(p-1)(q-1)$, the node input sequence represents x and the node output sequence represents y.

19. A random sequence generator as claimed in claim 18 wherein d is equal to 3.

20. A random sequence generator as claimed in claim 17 wherein each node input sequence is extended by a single modular operation.

21. A random sequence generator as claimed in claim 17 wherein each node input sequence is extended by the operation $$y = a_e x^e + a_{e-1} x^{e-1} + \ldots + a_1 x + a_0 \pmod{N}$$

where $e, a_e, a_{e-1}, \ldots, a_0$ and N are integers, the node input sequence represents x and the node output sequence represents y, and where there is at least one $a_d$ of $a_e, a_{e-1}, \ldots, a_3$ not equal to zero and the greatest common divisor of d and $\phi(N)$ is equal to one where $\phi(N)$ is Euler's Totient function.

22. A method of generating a random sequence from a seed random sequence of substantially shorter length, comprising performing a tree operation by extending, at each node of the tree structure, a node input random sequence into a longer node output random sequence, a final random output sequence being generated from successive leaves of the tree structure.

23. A method as claimed in claim 22 wherein each node input sequence is extended by the operation $$y = ax^d \pmod{N}$$

where N is the product of two large random primes p and q, d is an integer that is relatively prime to $(p-1)(q-1)$, the node input sequence represents x and the node output sequence represents y.

24. A method as claimed in claim 23 wherein d is equal to 3.

25. A method as claimed in claim 22 wherein each node input sequence is extended by a single modular operation.

26. A random sequence generator as claimed in claim 22 wherein each node input sequence is extended by the operation $$y = a_e x^e + a_{e-1} x^{e-1} + \ldots + a_1 x + a_0 \pmod{N}$$

where $e, a_e, a_{e-1}, \ldots, a_0$ and N are integers, the node input sequence represents x and the node output sequence represents y, and where there is at least one $a_d$ of $a_e, a_{e-1}, \ldots, a_3$ not equal to zero and the greatest common divisor of d and $\phi(N)$ is equal to one where $\phi(N)$ is Euler's Totient function.

27. A method of generating a random sequence from a seed random sequence of substantially shorter length comprising performing a tree operation by extending, at each node of a tree structure, a node input sequence into a longer node output random sequence, a plurality of node output random sequences of the tree structure together comprising a final random output sequence.

28. A method as claimed in claim 27 wherein each node input sequence is extended by the operation $$y = ax^d \pmod{N}$$

where N is the product of two large random primes p and q, d is an integer that is relatively prime to $(p-1)(q-1)$, the node input sequence represents x and the node output sequence represents y.

29. A method as claimed in claim 28 wherein d is equal to 3.

30. A method as claimed in claim 27 wherein each node input sequence is extended by a single modular operation.

31. A random sequence generator as claimed in claim 27 wherein each node input sequence is extended by the operation $$y = a_e x^e + a_{e-1} x^{e-1} + \ldots + a_1 x + a_0 \pmod{N}$$

where $e, a_e, a_{e-1}, \ldots, a_0$ and N are integers, the node input sequence represents x and the node output sequence represents y, and where there is at least one $a_d$ of $a_e, a_{e-1}, \ldots, a_3$ not equal to zero and the greatest common divisor of d and $\phi(N)$ is equal to one where $\phi(N)$ is Euler's Totient function.

32. A method of generating a random sequence from a seed random sequence of substantially shorter length comprising in each of a plurality of processors, extending a node input random sequence into a longer node output random sequence, each of the plurality of processors performing a portion of a tree structure by extending a node input sequence and then separately extending different portions of a node output sequence in successive operations at successive nodes of the tree structure.

33. A method as claimed in claim 32 wherein each node input sequence is extended by the operation $$y = ax^d \pmod{N}$$

where N is the product of two large random primes p and q, d is an integer that is relatively prime to $(p-1)(q-1)$, the node input sequence represents x and the node output sequence represents y.

34. A method as claimed in claim 33 wherein d is equal to 3.

35. A method as claimed in claim 32 wherein each node input sequence is extended by a single modular operation.

36. A random sequence generator as claimed in claim 32 wherein each node input sequence is extended by the operation $$y = a_e x^e + a_{e-1} x^{e-1} + \ldots + a_1 x + a_0 \pmod{N}$$

where $e, a_e, a_{e-1}, \ldots, a_0$ and N are integers, the node input sequence represents x and the node output sequence represents y, and where there is at least one $a_d$ of $a_e, a_{e-1}, \ldots, a_3$ not equal to zero and the greatest common divisor of d and $\phi(N)$ is equal to one where $\phi(N)$ is Euler's Totient function.

37. An encryption system comprising an encryption unit for performing a transform between encrypted and nonencrypted messages, based on an extended random sequence, and a random sequence generator for generating the random sequence from a seed random sequence and an index input, the random sequence generator performing a tree operation by extending, at each node of a tree structure, a node input random sequence into a longer node output random sequence.

38. An encryption system as claimed in claim 37 wherein each node input sequence is extended by the operation $$y = ax^d \pmod{N}$$

where N is the product of two large random primes p and q, d is an integer that is relatively prime to $(p-1)(q-1)$, the node input sequence represents x and the node output sequence represents y.

39. An encryption system as claimed in claim 38 wherein d is equal to 3.

40. An encryption system as claimed in claim 37 wherein each node input sequence is extended by a single modular operation.

41. An encryption system as claimed in claim 37 wherein the random sequence applied to the encryption unit comprises a plurality of node output random sequences of the tree structure.

42. An encryption system as claimed in claim 41 wherein the random sequence applied to the encryption unit is generated as successive leaves of the tree structure.

43. An encryption system as claimed in claim 37 wherein the random sequence generator comprises a plurality of processors, each of the plurality of processors performing a portion of the tree structure.

44. A random sequence generator as claimed in claim 37 wherein each node input sequence is extended by the operation $$y = a_e x^e + a_{e-1} x^{e-1} + \ldots + a_1 x + a_0 \pmod{N}$$

where $e, a_e, a_{e-1}, \ldots, a_0$ and N are integers, the node input sequence represents x and the node output sequence represents y, and where there is at least one $a_d$ of $a_e, a_{e-1}, \ldots, a_3$ not equal to zero and the greatest common divisor of d and $\phi(N)$ is equal to one where $\phi(N)$ is Euler's Totient function.

45. A method of message encryption comprising generating a random sequence from a seed random sequence and an index input, the random sequence being generated in a tree operation by extending, at each node of a tree structure, a node input random sequence into a longer node output random sequence and, based on the extended random sequence, performing a transform between encrypted and nonencrypted messages.

46. A method as claimed in claim 45 wherein each node input sequence is extended by a single modular operation.

47. A method as claimed in claim 45 wherein the random sequence applied to the encryption unit comprises a plurality of node output random sequences of the tree structure.

48. A method as claimed in claim 47 wherein the random sequence applied to the encryption unit is generated as successive leaves of the tree structure.

49. A method as claimed in claim 45 wherein the random sequence generator comprises a plurality of processors, each of the plurality of processors performing a portion of the tree structure.

50. A random sequence generator as claimed in claim 45 wherein each node input sequence is extended by the operation $$y = a_e x^e + a_{e-1} x^{e-1} + \ldots + a_1 x + a_0 \pmod{N}$$

where $e$, $a_e$, $a_{e-1}$, ..., $a_0$ and $N$ are integers, the node input sequence represents x and the node output sequence represents y, and where there is at least one $a_d$ of $a_e$, $a_{e-1}$, ..., $a_3$ not equal to zero and the greatest common divisor of d and $\phi(N)$ is equal to one where $\phi(N)$ is Euler's Totient function.

51. A method of generating a random sequence from a random seed comprising, in each of iterative steps, applying a function to an input string of random bits to obtain an output string of bits, significantly less than all of an output string of bits being used in an input string of bits in each successive step, and utilizing other bits of the output string toward the random sequence.

52. A method as claimed in claim 51 wherein each input string is about ⅔ or less of the bits of the output string from the previous step.

53. A method as claimed in claim 51 wherein the other bits utilized toward the random sequence are a part of the generated random sequence.

54. A method as claimed in claim 51 wherein the iterative steps are performed in a tree operation and the function is also applied to the other bits of the output string utilized toward the random sequence.

55. A method as claimed in claim 51 wherein each output string of bits is obtained by the function $$y = a_e x^e + a_{e-1} x^{e-1} + \ldots + a_1 x + a_0 \pmod{N}$$

where $e$, $a_e$, $a_{e-1}$, ..., $a_0$ and $N$ are integers, the input string represents x and the output string represents y and where the number of bits in x is significantly less than the number of bits in N.

56. A random sequence generator as claimed in claim 51 wherein each input string of bits is extended by the function $$y = a_e x^e + a_{e-1} x^{e-1} + \ldots + a_1 x + a_0 \pmod{N}$$

where $e$, $a_e$, $a_{e-1}$, ..., $a_0$ and $N$ are integers, the input string represents x and the output string represents y, and where there is at least one $a_d$ of $a_e$, $a_{e-1}$, ..., $a_3$ not equal to zero and the greatest common divisor of d and $\phi(N)$ is equal to one where $\phi(N)$ is Euler's Totient function.

57. A method of generating a random sequence from a random seed comprising, in each of iterative steps, applying a function to an input string of random bits to obtain an output string of bits, significantly less than all of an output string of bits being used as an input string of bits in each successive step, at least some of the bits of each output string being a part of the generated random sequence.

58. A method as claimed in claim 57 wherein each input string is about ⅔ or less of the bits of the output string from the previous step.

59. A method as claimed in claim 57 wherein each output string of bits is obtained by the function $$y = a_e x^e + a_{e-1} x^{e-1} + \ldots + a_1 x + a_0 \pmod{N}$$

where $e$, $a_e$, $a_{e-1}$, ..., $a_0$ and $N$ are integers, the input string represents x and the output string represents y and where the number of bits in x is significantly less than the number of bits in N.

60. A random sequence generator as claimed in claim 57 wherein each input string of bits is extended by the function $$y = a_e x^e + a_{e-1} x^{e-1} + \ldots + a_1 x + a_0 \pmod{N}$$

where $e$, $a_e$, $a_{e-1}$, ..., $a_0$ and $N$ are integers, the input string represents x and the output string represents y, and where there is at least one $a_d$ of $a_e$, $a_{e-1}$, ..., $a_3$ not equal to zero and the greatest common divisor of d and $\phi(N)$ is equal to one where $\phi(N)$ is Euler's Totient function.

* * * * *